US012626094B2

(12) United States Patent
Cintas et al.

(10) Patent No.: US 12,626,094 B2
(45) Date of Patent: May 12, 2026

(54) ANOMALY DETECTION IN TIME-BASED EVENTS VIA PATTERN MINING

(71) Applicant: International Business Machines Corporation, Armonk, NY (US)

(72) Inventors: Celia Cintas, Nairobi (KE); Girmaw Abebe Tadesse, Nairobi (KE); Skyler Speakman, Nairobi (KE); Komminist Weldemariam, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 18/338,108

(22) Filed: Jun. 20, 2023

(65) Prior Publication Data

US 2024/0428049 A1      Dec. 26, 2024

(51) Int. Cl.
*G06N 3/044*          (2023.01)

(52) U.S. Cl.
CPC .................................. *G06N 3/044* (2023.01)

(58) Field of Classification Search
CPC ......... G06N 3/044; G06N 3/045; G06N 3/084
See application file for complete search history.

(56) References Cited

U.S. PATENT DOCUMENTS

| | | | |
|---|---|---|---|
| 8,495,429 B2 | 7/2013 | Fu et al. | |
| 9,361,463 B2 | 6/2016 | Ferragut et al. | |
| 10,223,403 B2 | 3/2019 | Malhotra et al. | |
| 11,301,563 B2 | 4/2022 | Huang et al. | |
| 2012/0041575 A1 | 2/2012 | Maeda et al. | |
| 2018/0075235 A1 | 3/2018 | Tajima et al. | |
| 2019/0147300 A1* | 5/2019 | Bathen | G06N 3/084 706/12 |
| 2021/0224648 A1* | 7/2021 | Zhuang | G06N 3/045 |

FOREIGN PATENT DOCUMENTS

| | | |
|---|---|---|
| JP | 2021177284 | 11/2021 |
| WO | 2017/087591 A1 | 5/2017 |

OTHER PUBLICATIONS

Anonymous, "Deep mining: Detecting Anomalous Patterns in Neural Network Activations with Subset Scanning," ICLR, 2020, 12 pages.

(Continued)

*Primary Examiner* — Pei Yong Weng
(74) *Attorney, Agent, or Firm* — Yee & Associates, P.C.

(57)          ABSTRACT

Anomaly detection in neural networks is provided. The method comprises extracting, from different layers of a recurrent neural network (RNN) for a specified time interval, a number of on-the-fly node activations produced by sequences of event data from a number of data sources and sensors. The method references known node activations of the RNN produced by normal sequences of event data, and for each layer of the RNN, calculates a maximum nonparametric divergence of the on-the-fly node activations from the known node activations. For each layer of the RNN, the method determines a subset of nodes that most contribute to the maximum nonparametric divergence for that layer for a given time window and identifies data sources or sensors from among the number of data sources and sensors responsible for activating the subset of nodes that most contribute to the maximum nonparametric divergence for each layer.

20 Claims, 5 Drawing Sheets

(56) References Cited

OTHER PUBLICATIONS

Ko et al., "Detecting anomalies in business process event logs using statistical leverage," Information Sciences, 2021, 549:53-67, 15 pages.

Fotiadou et al., "Network Traffic Anomaly Detection via Deep Learning," Information, 2021, vol. 12, No. 215, 17 pages.

Hashemi et al., "SiaLog: detecting anomalies in software execution logs using the Siamese network," Automated Software Engineering, 2022, vol. 29, No. 61, 28 pages.

Du et al., "Deeplog: Anomaly detection and diagnosis from system logs through deep learning", https://dl.acm.org/doi/10.1145/3133956.3134015, Oct. 30, 2017, pp. 1285-1298.

Maleki et al., "Unsupervised anomaly detection with LSTM autoencoders using statistical data-filtering", https://www.sciencedirect.com/science/article/abs/pii/S1568494621003665, Sep. 2021, 10 pages.

Vinzamuri et al., "An End-to-End Context Aware Anomaly Detection System", https://ieeexplore.jeee.org/document/9377767, Dec. 2020, pp. 1689-1698.

* cited by examiner

COMPUTING ENVIRONMENT
100

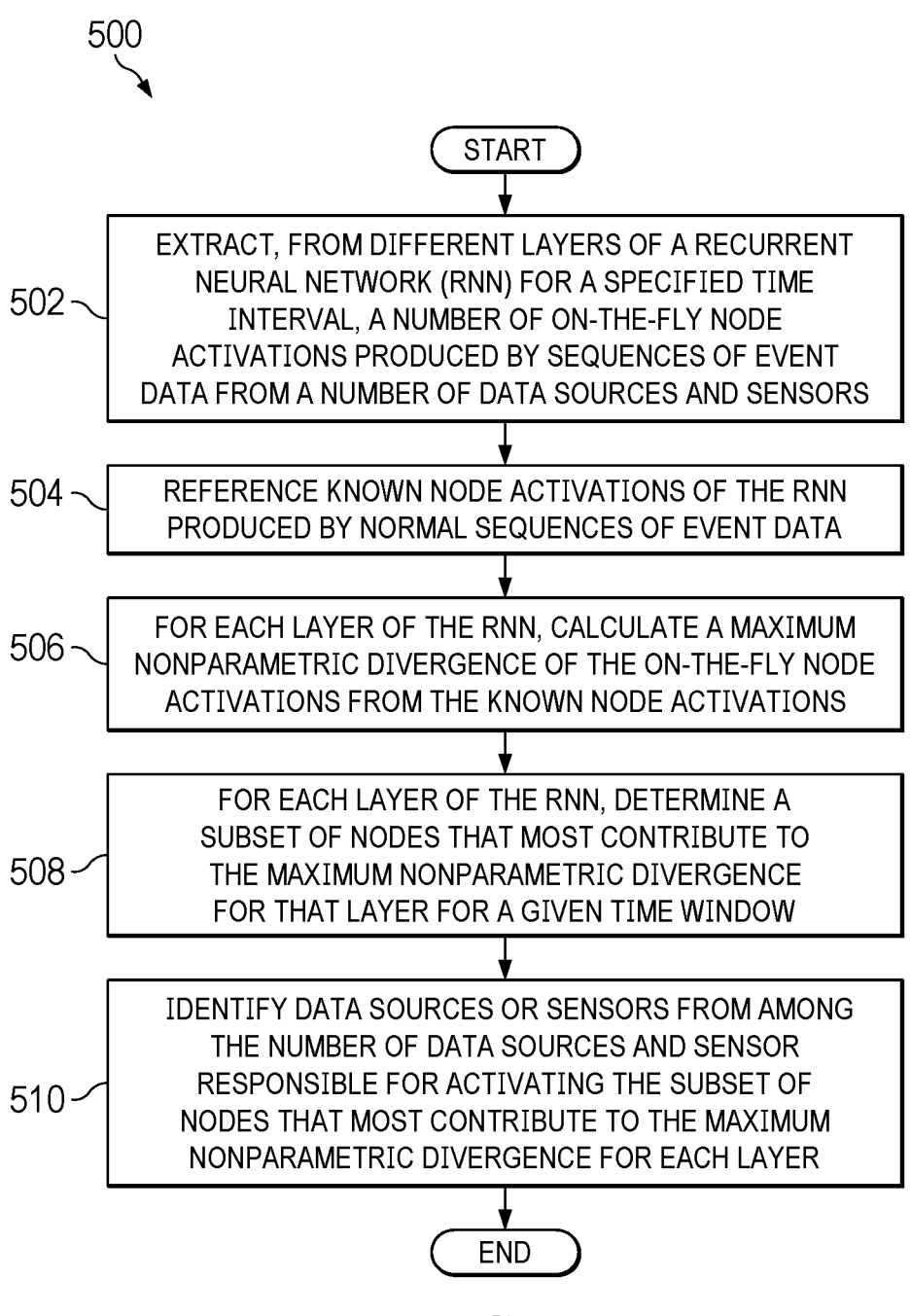

500

START

502 — EXTRACT, FROM DIFFERENT LAYERS OF A RECURRENT NEURAL NETWORK (RNN) FOR A SPECIFIED TIME INTERVAL, A NUMBER OF ON-THE-FLY NODE ACTIVATIONS PRODUCED BY SEQUENCES OF EVENT DATA FROM A NUMBER OF DATA SOURCES AND SENSORS

504 — REFERENCE KNOWN NODE ACTIVATIONS OF THE RNN PRODUCED BY NORMAL SEQUENCES OF EVENT DATA

506 — FOR EACH LAYER OF THE RNN, CALCULATE A MAXIMUM NONPARAMETRIC DIVERGENCE OF THE ON-THE-FLY NODE ACTIVATIONS FROM THE KNOWN NODE ACTIVATIONS

508 — FOR EACH LAYER OF THE RNN, DETERMINE A SUBSET OF NODES THAT MOST CONTRIBUTE TO THE MAXIMUM NONPARAMETRIC DIVERGENCE FOR THAT LAYER FOR A GIVEN TIME WINDOW

510 — IDENTIFY DATA SOURCES OR SENSORS FROM AMONG THE NUMBER OF DATA SOURCES AND SENSOR RESPONSIBLE FOR ACTIVATING THE SUBSET OF NODES THAT MOST CONTRIBUTE TO THE MAXIMUM NONPARAMETRIC DIVERGENCE FOR EACH LAYER

END

FIG. 5

ANOMALY DETECTION IN TIME-BASED EVENTS VIA PATTERN MINING

BACKGROUND

The present disclosure relates generally to an improved computing system, and more specifically to identifying anomalies in artificial neural networks.

Many typical modern life functions, ranging from banking systems to utility consumption control, rely on a series of heterogeneous computing systems. Anomaly detection and identifying early indicators of system malfunctioning such as system failures, abnormalities, and carbon emission, are critical components of building a robust and sustainable system. The primary purpose of a system log or sensor readings is to record system states at various essential points to help monitor and detect these malfunctioning and provide recommendations for asset maintenance or perform root cause analysis. These types of countermeasure solutions reduce system or asset unavailability, critical failures, and associated carbon footprint through effective asset utilization for energy production. As systems and applications become increasingly complex (code, dependencies interactions, or sensor data complexity), they are subject to more bugs and vulnerabilities

SUMMARY

An illustrative embodiment provides a method of anomaly detection in neural networks. The method comprises extracting, from different layers of a recurrent neural network (RNN) for a specified time interval, a number of on-the-fly node activations produced by sequences of event data from a number of data sources and sensors. The method references known node activations of the RNN produced by normal sequences of event data, and for each layer of the RNN, calculates a maximum nonparametric divergence of the on-the-fly node activations from the known node activations. For each layer of the RNN, the method determines a subset of nodes that most contribute to the maximum nonparametric divergence for that layer for a given time window and identifies data sources or sensors from among the number of data sources and sensors responsible for activating the subset of nodes that most contribute to the maximum nonparametric divergence for each layer. According to other illustrative embodiments, a computer system, and a computer program product for anomaly detection in neural networks are provided.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 depicts a flowchart of a process for anomaly scoring for temporal samples in accordance with an illustrative embodiment.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
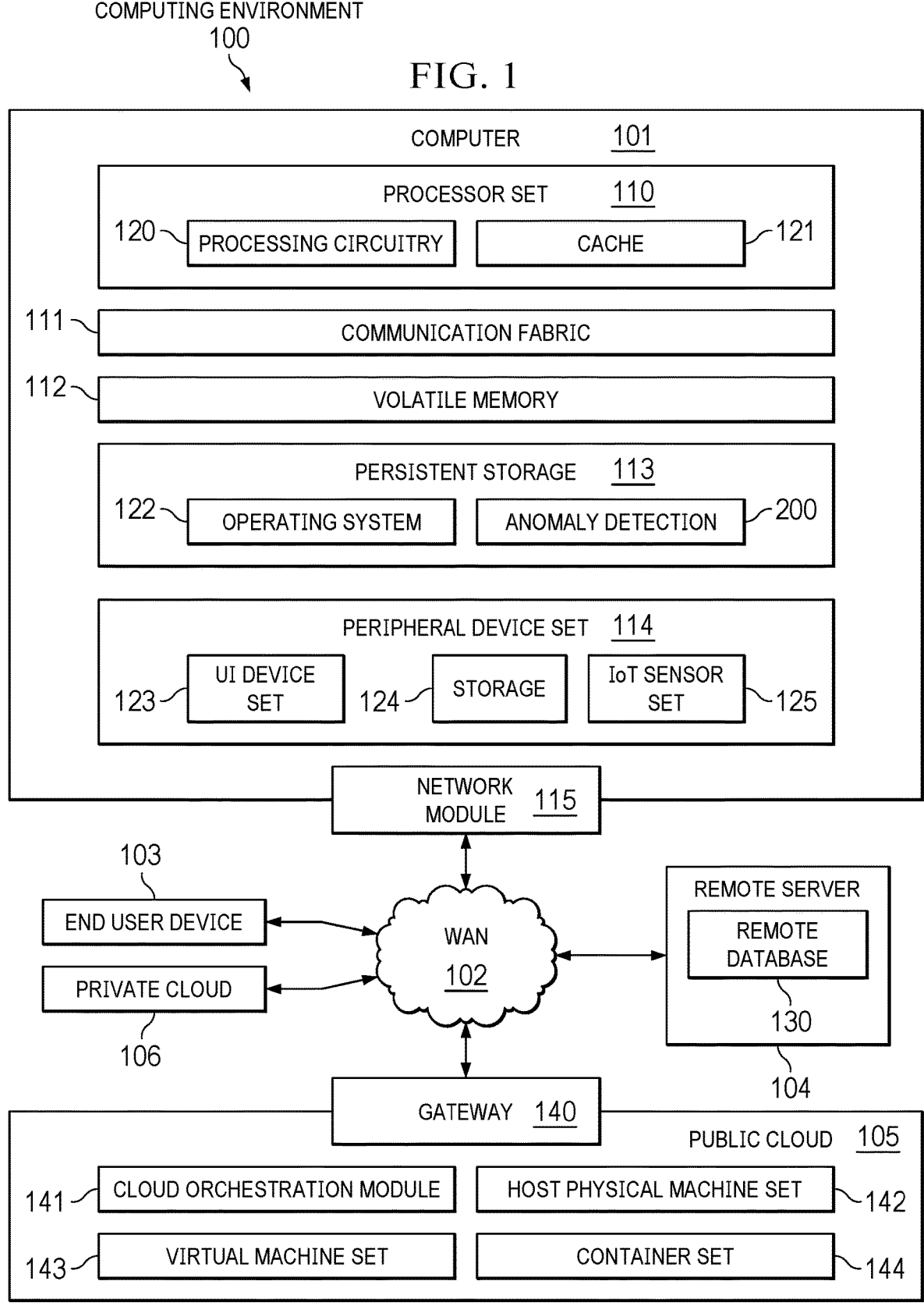
FIG. 1 depicts a pictorial representation of a computing environment in which illustrative embodiments may be implemented.

With reference now to the figures, and in particular, with reference to FIG. 1, a diagram of a data processing environment is provided in which illustrative embodiments may be implemented. It should be appreciated that FIG. 1 is only meant as an example and are not intended to assert or imply any limitation with regard to the environments in which different embodiments may be implemented. Many modifications to the depicted environment may be made.

FIG. 1 depicts a pictorial representation of a computing environment in which illustrative embodiments may be implemented. Computing environment 100 contains an example of an environment for the execution of at least some of the computer code involved in performing the inventive methods, such as anomaly detection 200. In addition to anomaly detection 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and anomaly detection 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in anomaly detection 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. Anomaly detection instructions included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account that modern systems maintain log data or sensor readings as a regular practice to record system states at various essential points to help debug system malfunctioning such as failures, anomalies, and emissions. Modern systems are also used to design countermeasures, such as providing recommendations for asset maintenance, performing root cause analysis, and recommending emission reduction strategies.

The illustrative embodiments also recognize and take into account console logs rarely help system administrators to detect problems in large-scale data center services. These logs often consist of the voluminous intermixing of messages from many software components written by independent developers.

The illustrative embodiments also recognize and take into account that traditional anomaly detection frameworks operate primarily as supervised or semi-supervised methods. The former expects there is enough labeled data to learn a discriminative model which is not always the case, whereas the latter expects that there exists a distinct feature-level signature of anomalies globally when compared to normal data. This assumption need not always hold true as anomalous instances can be normal at the feature signature level, but they can demonstrate abnormal behavior across a set of features.

The illustrative embodiments provide a method to identify anomalies in time-based event logs by detecting a subset of anomalous node activations in a Recurrent Neural Network's (RNN) inner layers. These nodes, as a group, maximize a nonparametric measure of divergence away from the normal behavior of activations created from typical sequences of events data. The illustrative embodiments efficiently score subsets of nodes and return the nodes within each layer of the recurrent network that contribute to the maximum score.

Artificial neural networks comprise a number of nodes. Each node combines multiple inputs from other nodes, and the input is multiplied by a respective weight that either amplifies or dampens that input, thereby assigning significance to each input for the task the algorithm is trying to learn. The connections between nodes are called edges. When the node receives an input value, it multiplies that input value by the weight assigned to that edge. A net input function adds each weighted input to a bias term and then passes the result to an activation function which produces the node's activation (i.e., output).

An RNN is a type of neural network in which the nodes are formed along a temporal sequence. RNNs exhibit temporal dynamic behavior, meaning they model behavior that varies over time. RNNs are recurrent because they perform the same task for every element of a sequence, with the output being dependent on the previous computations. RNNs can be thought of as multiple copies of the same network, in which each copy passes a message to a successor. Whereas traditional neural networks process inputs independently, starting from scratch with each new input, RNNs persistence information from a previous input that informs processing of the next input in a sequence. There are several variants of RNNs such as, e.g., "vanilla" RNNs. Gated Recurrent Unit (GRU), Long Short-Term Memory (LSTM), and others with which the illustrative embodiments can be implemented.

Figure 2:
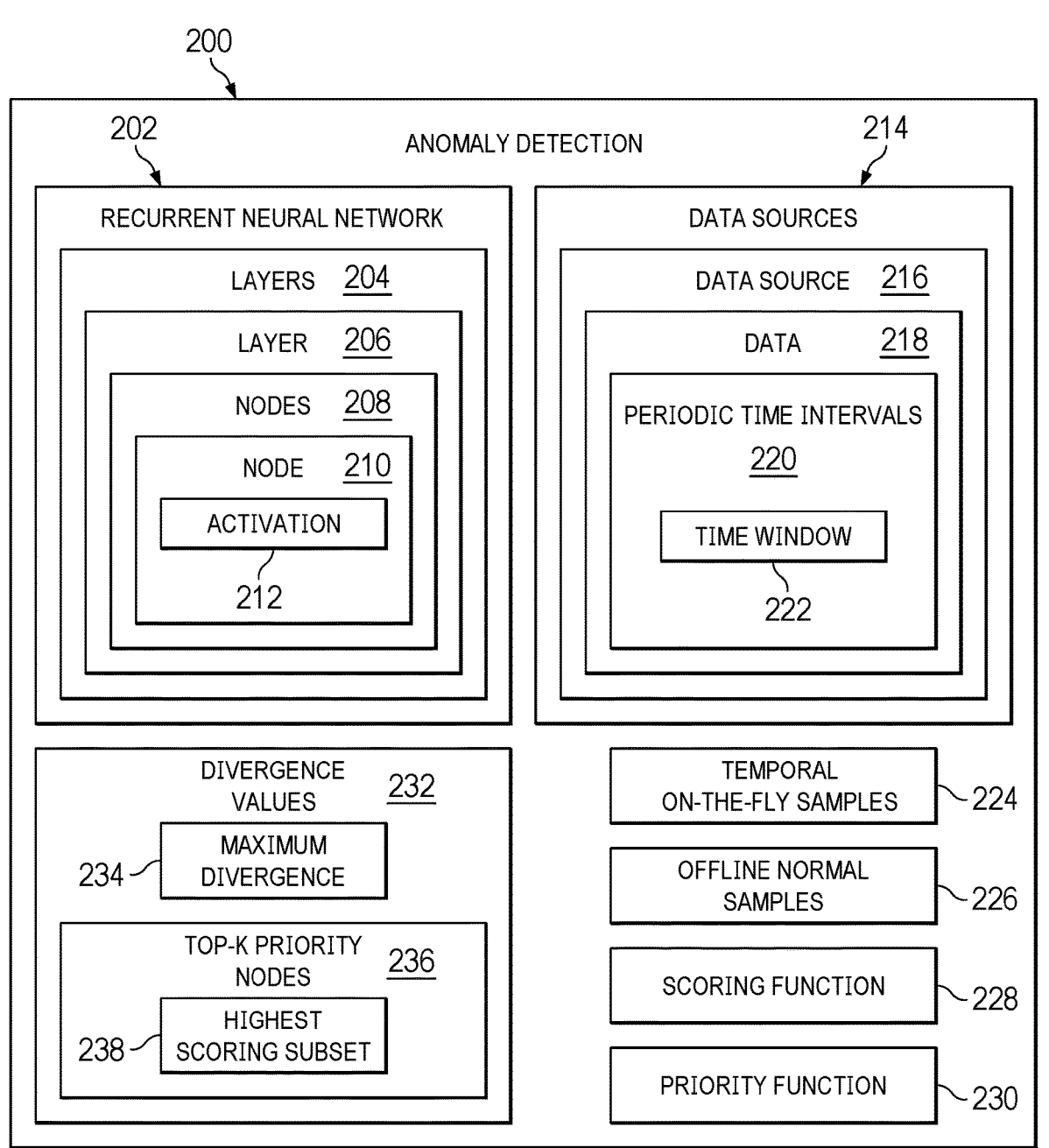
FIG. 2 depicts a block diagram for anomaly detection in accordance with an illustrative embodiment.

FIG. 2 depicts a block diagram for anomaly detection in accordance with an illustrative embodiment. Anomaly detection 200 can be implemented in computing environment 100 in FIG. 1.

Anomaly detection 200 is implemented with a trained recurrent neural network (RNN) 202. RNN 202 comprises a number of layers 206, each layer 206 comprising a number of nodes 208. Each node 210 has a respective activation 212 in response to input data.

Number of data sources 214 provide data to RNN 202. Data sources 214 might comprise, e.g., multiple sensors. Data sources 214 might also comprise multi-model data sources. Each data source 216 provides data 218 over a series of period time intervals 220 of a specified length. The data sources 214 can also be integrated at different layers 206 of RNN 202. By thus integrating data sources 214 at different stages of the sequence model, anomaly detection can be performed at each data source 216 or subsets of data sources 214.

Anomaly detection 200 extracts a number of temporal on-the-fly samples 212 of node activations within RNN 202 for a specified time window 222 within the series of period time intervals 220. Anomaly detection 200 compares these temporal on-the-fly samples 212 to a number of offline normal samples 226 of node activations previously extracted from RNN 202 for known data, which serve as normative reference values. Input perturbations might also be used to enhance detection of anomalous samples among temporal on-the-fly samples 212 of node activations.

A scoring function 228 calculates divergence values 232 of the temporal on-the-fly samples 224 relative to the normal samples 226. And a maximum divergence 234 is calculated for each layer 206 of RNN 202. A priority function 230 determines the top-k priority nodes 236 in each layer 206 that contribute to the maximum divergence 234 for that layer. From these top-k priority nodes, anomaly detection determines the highest scoring subset 238 within each layer that produces the maximum divergence 234. This higher scoring subset 238 can be displayed to a user through user interface 123 to identify which of the data sources 214 is producing the anomalous activations.

In addition to clustering nodes 208 within each layer 206 into subsets, a subset of layers 204 within RNN 202 can be identified that contribute most to an overall maximum deviation of the whole RNN 202.

Figure 3:
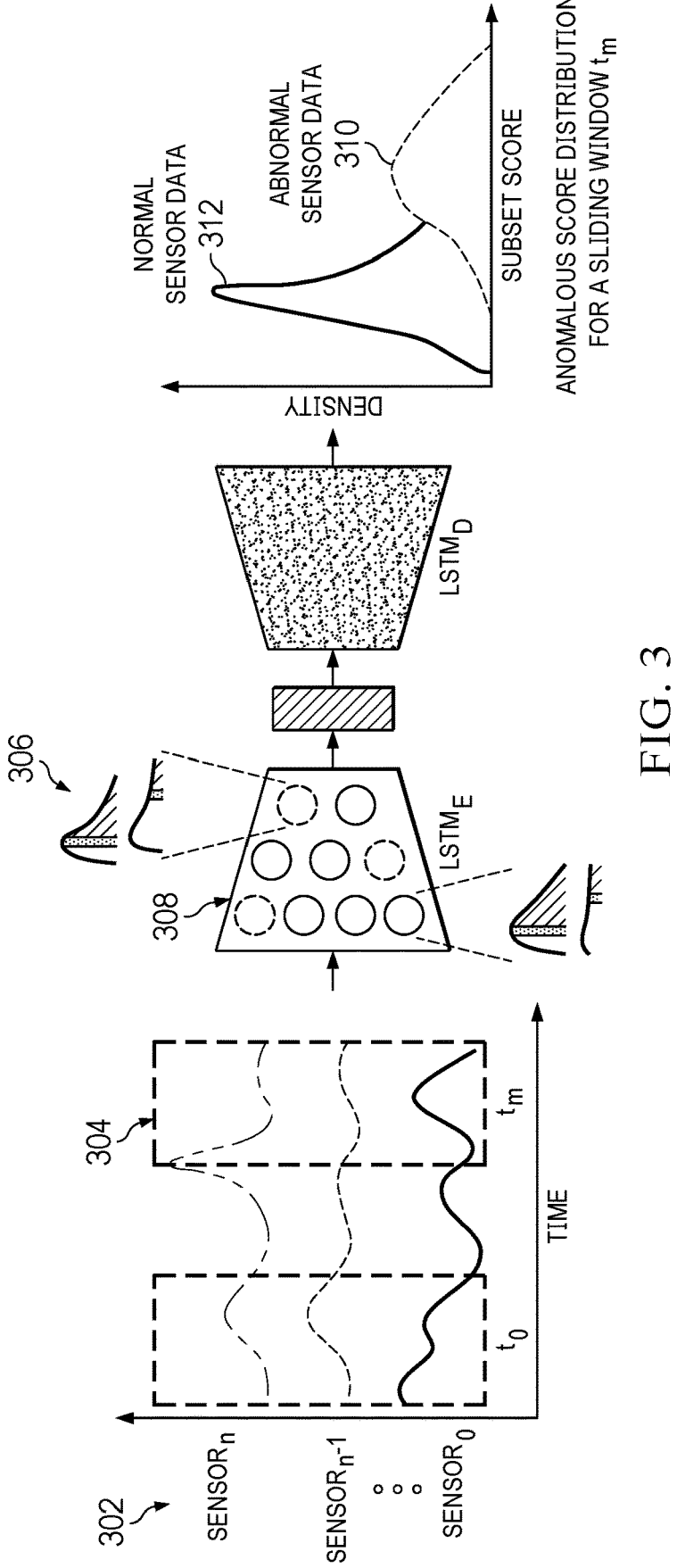
FIG. 3 depicts an overview of anomaly detection in accordance with an illustrative embodiment.

FIG. 3 depicts an overview of anomaly detection in accordance with an illustrative embodiment. The illustrative embodiments extract samples of on-the-fly node activations 306 in an RNN encoder 308 produced by a number of sensors 302 or other data sources for a given time window $t_m$ 304 within a series of periodic time intervals. The sampled on-the-fly node activations 306 are compared to offline normal sample activations ($H_0$) for the RNN encoder 308 over a set of time windows, which are used as reference norms.

Deviations of the on-the-fly sample activations 306 from the normal sample activations are calculated as p-values, which are then maximized. From this maximization of nonparametric deviation, anomalous subsets of nodes in the network are identified. An example of a score distribution produced by abnormal sensor data 310 is shown contrasted with a score distribution produced by normal sensor data 312.

Subset scanning is an approach to pattern detection, which treats the problem as a search for the "most anomalous" subset of observations in the data, S. Herein, anomalousness is quantified by a scoring function, F(S). The illustrative embodiments formulate the abnormal sequential pattern detection problem as being able to efficiently identify $S^*=\arg \max_S F(s)$ over all relevant subsets of node activations within an RNN model (e.g., LSTME) that is processing sequential time-series data (system logs or sensors) at runtime. The method of the illustrative embodiments work uses non-parametric scan statistics (NPSS). Given the nature of the datasets and problem setup, the illustrative embodiments ensure that the sampling protocol taken for this case corresponds to sequential overlapping series of events for a defined time window size w.

For NPSS one can assume a set of normal time-windows (intervals) of events $X_z$ included data samples from expected or normal behavior, $D_{H_0}$. These samples generate activations $$A_{zj}^{H_0}$$

at each node $O_j$ from a given layer. A test time-window sample under evaluation, $X_i$ (not in $D_{H_0}$) creates activations $A_{ij}$ at each node $O_j$ in the network. The p-value, $p_{ij}$, is the proportion of background activations $$A_{zj}^{H_0}$$

greater than the activation induced by the test sample $A_{ij}$ at node $O_j$. The test sample $X_i$ is converted to a vector of p-values $p_{ij}$ of length $J=|O|$. The key assumption is that under the alternative hypothesis of an anomaly present in the activation data, at least some subset of the activations $S_O \subseteq O$ will systematically appear extreme. To identify and quantify this set of p-values nonparametric scan statistics are used, as it makes minimal assumptions on the underlying data distribution.

The general form of the NPSS score function is:

$$F(S) = \max_\alpha F_\alpha(S) = \max_\alpha \phi(\alpha, N_\alpha(S), N(S)) \qquad \text{Eq. 1}$$

where N(S) represents the number of empirical p-values contained in subset S, and $N_\alpha(S)$ is the number of p-values less than (significance level) $\alpha$ contained in subset S.

There are well-known goodness-of-fit statistics that can be utilized in NPSS. The illustrative embodiments use the Berk-Jones test statistic:

$$\phi_{BJ}(\alpha, N_\alpha, N) = N * KL\left(\frac{N_\alpha}{N}, \alpha\right) \qquad \text{Eq. 2}$$

where KL is the Kullback-Liebler divergence:

$$KL(x, y) = x \log\frac{x}{y} + (1-x)\log\frac{1-x}{1-y} \qquad \text{Eq. 3}$$

between the observed and expected proportions of significant p-values.

Although NPSS provides a means to evaluate the anomalousness of a subset of node activations, $S_O$, discovering which of the $2^J$ possible subsets provides the most evidence of an anomalous pattern is computationally infeasible for moderately sized datasets. However, NPSS has been shown to satisfy the linear-time subset scanning (LTSS) property, which allows for an efficient and exact maximization over subsets of data. LTSS is a computational task of determining whether there exists a subset within a given set of numbers whose sum equals a target value.

The LTSS property uses a priority function $G(O_j)$ to rank nodes and then proves that the highest-scoring subset comprises the top-k priority nodes for some k in 1 . . . . J. The priority of a node for NPSS is the proportion of p-values that are less than $\alpha$. Letting $S_{(k)}$ be the subset containing the k nodes with the smallest p-values and letting $\alpha_k$ be the largest p-value among these k nodes, the LTSS property guarantees that the highest-scoring subset (over all a thresholds) will be one of these J subsets $S_{(1)}$, $S_{(2)}$, . . . $S_{(J)}$ with their corresponding a threshold. This approach reduces search space while still guaranteeing identification of the highest-scoring subset of nodes for a time-window sample under evaluation.

Figure 4:
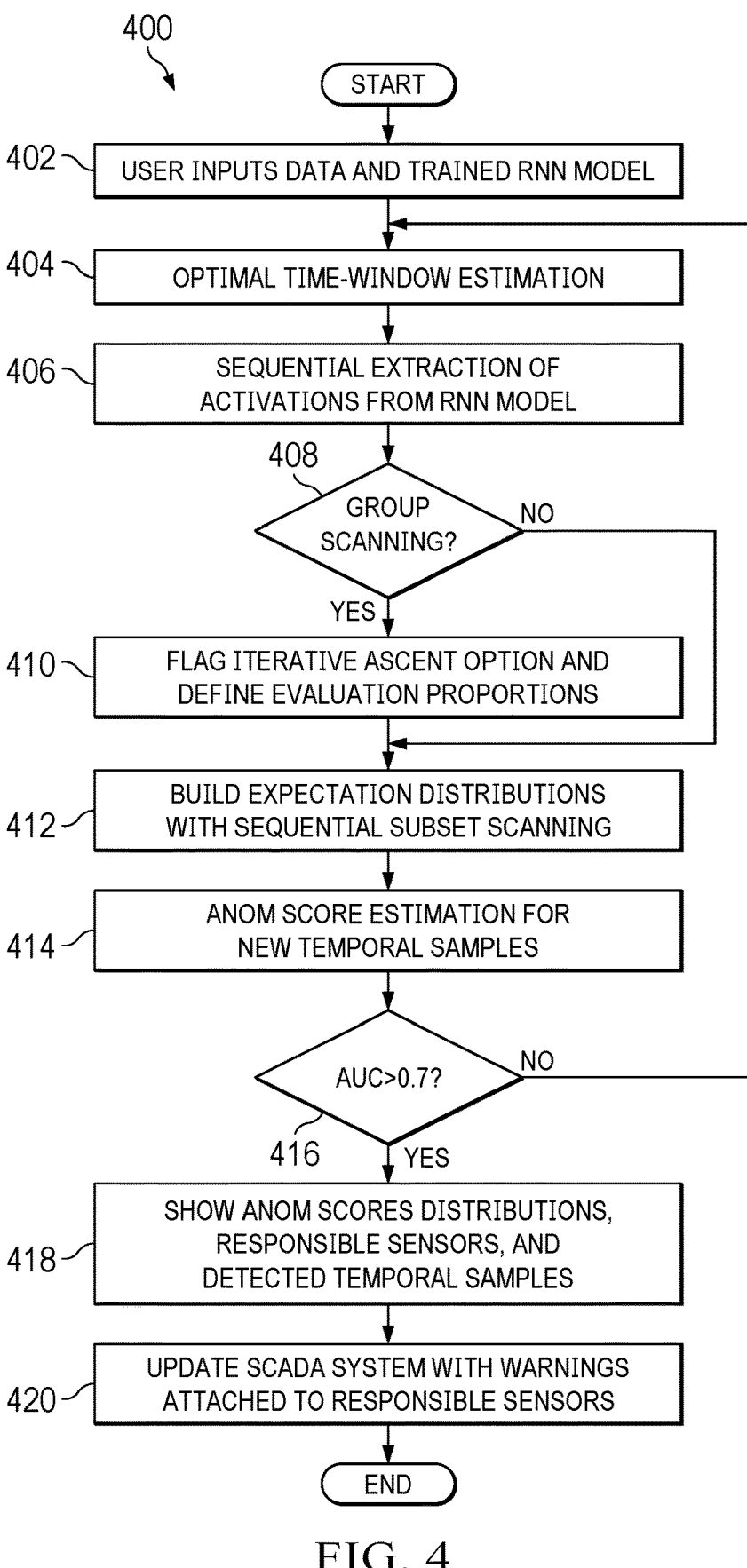
FIG. 4 depicts a flowchart of a process for anomaly detection in neural networks in accordance with an illustrative embodiment.

FIG. 4 depicts a flowchart of a process for anomaly detection in neural networks in accordance with an illustrative embodiment. The operations (i.e., steps) of process 400 can occur within (or on) computing environment 100 of FIG. 1.

Process 400 begins with a user inputting normative data into an RNN (step 402). Process 400 then estimates an optimal time window (i.e., periodic interval length) to use for sampling (step 404).

Process 400 performs sequential extraction of activations from the RNN model based on the normative data (step 406). Responsive to a determination that group scanning is not selected (step 408), process 400 builds expectation distributions with sequential subset scanning (step 412). Responsive to a determination that group scanning mode is selected, process 400 enables an iterative ascent option to do a double optimization, between the subset of sensors and subset of time windows (step 410). As process 400 examines groups of samples it defines thresholds to assess at which proportions of anomalies the solution is robust and can be used before proceeding to step 412.

After the expectation distributions are in place, process 400 calculates an anomaly score estimation for new temporal samples extracted from the RNN on-the-fly (step 414). Responsive to a determination that the area under the receiver operating characteristic curve (AUROC) value of step 414 does not meet a specified threshold (e.g., 0.7) (step 416), process 400 returns to step 404. AUROC is a metric used in machine learning to evaluate the performance of a model. Higher AUROC values indicate better discrimination between positive and negative values.

If the AUROC value of step 414 does meet the specified threshold, process 400 displays the anomaly score distributions, responsible sensors, and detected temporal samples to the user (step 418) and updates a supervisory control and data acquisition (SCADA) system with warnings attached to responsible sensors (step 420).

Process 400 then ends.

FIG. 5 depicts a flowchart of a process for anomaly scoring for temporal samples in accordance with an illustrative embodiment. Process 500 is a detailed example of step 414 in FIG. 4.

Process 500 begins by extracting, from different layers of a recurrent neural network (RNN) at specified time intervals, a number of on-the-fly node activations produced by sequences of event data from a number of data sources and sensors (step 502). The RNN might be, e.g., a recurrent autoencoder, a gated recurrent network, or a long short-term memory (LSTM) network.

Process 500 references known node activations of the RNN produced by normal sequences of event data (step 504).

For each layer of the RNN, process 500 calculates a maximum nonparametric divergence of the on-the-fly node activations from the known node activations (step 506). For each layer of the RNN, process 500 identifies a subset of nodes that most contribute to the maximum nonparametric divergence for that layer for a given time window (step 508).

Process 500 then identifies data sources or sensors from among the number of data sources and sensors responsible for activating the subset of nodes that most contribute to the maximum nonparametric divergence for each layer.

Process 500 then ends.

As used herein, a "number of," when used with reference to objects, means one or more objects. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, a "computer instruction," or "computer program", means one step or a set of steps that includes information on how to operate, perform, or maintain particular computer software or hardware. For example, a "computer instruction" can be a computer program instruction in the form of lines of code or source code that are executable by a computer system.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present disclosure have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method of anomaly detection in neural networks, the method comprising:
  extracting, from different layers of a recurrent neural network (RNN) for a specified time interval, a number of on-the-fly node activations produced by sequences of event data from a number of data sources and sensors;
  referencing known node activations of the RNN produced by normal sequences of event data;
  for each layer of the RNN, calculating a maximum nonparametric divergence of the on-the-fly node activations from the known node activations;
  for each layer of the RNN, determining a subset of nodes that most contribute to the maximum nonparametric divergence for that layer for a given time window; and
  identifying data sources or sensors from among the number of data sources and sensors responsible for activating the subset of nodes that most contribute to the maximum nonparametric divergence for each layer.

2. The method of claim 1, wherein the recurrent neural network comprises one of:
  a recurrent autoencoder;
  a gated recurrent network; or
  a long short-term memory network.

3. The method of claim 1, wherein the number of on-the-fly node activations corresponds to sequential overlapping series of events for a defined time window size.

4. The method of claim 1, wherein the data sources comprise multi-modal data sources.

5. The method of claim 1, further comprising identifying a subset of layers with the RNN that contribute most to an overall maximum deviation of the whole RNN.

6. The method of claim 1, wherein the data sources are integrated at different layers of the RNN.

7. The method of claim 1, further comprising using input perturbations to enhance detection of anomalous samples among the on-the-fly node activations.

8. A system for anomaly detection in neural networks, the system comprising:
  a storage device that stores program instructions;
  one or more processors operably connected to the storage device and configured to execute the program instructions to cause the system to:
  extracting, from different layers of a recurrent neural network (RNN) for a specified time interval, a number of on-the-fly node activations produced by sequences of event data from a number of data sources and sensors;
  referencing known node activations of the RNN produced by normal sequences of event data;
  for each layer of the RNN, calculating a maximum nonparametric divergence of the on-the-fly node activations from the known node activations;
  for each layer of the RNN, determining a subset of nodes that most contribute to the maximum nonparametric divergence for that layer for a given time window; and
  identifying data sources or sensors from among the number of data sources and sensors responsible for activating the subset of nodes that most contribute to the maximum nonparametric divergence for each layer.

9. The system of claim 8, wherein the recurrent neural network comprises one of:
  a recurrent autoencoder;
  a gated recurrent network; or
  a long short-term memory network.

10. The system of claim 8, wherein the number of on-the-fly node activations corresponds to sequential overlapping series of events for a defined time window size.

11. The system of claim 8, wherein the data sources comprise multi-modal data sources.

12. The system of claim 8, wherein the program instructions further cause the system to identify a subset of layers with the RNN that contribute most to an overall maximum deviation of the whole RNN.

13. The system of claim 8, wherein the data sources are integrated at different layers of the RNN.

14. The system of claim 8, wherein the program instructions further cause the system to use input perturbations to enhance detection of anomalous samples among the on-the-fly node activations.

15. A computer program product for anomaly detection in neural networks, the computer program product comprising:

a persistent storage medium having program instructions configured to cause one or more processors to:

extracting, from different layers of a recurrent neural network (RNN) for a specified time interval, a number of on-the-fly node activations produced by sequences of event data from a number of data sources and sensors;

referencing known node activations of the RNN produced by normal sequences of event data;

for each layer of the RNN, calculating a maximum nonparametric divergence of the on-the-fly node activations from the known node activations;

for each layer of the RNN, determining a subset of nodes that most contribute to the maximum nonparametric divergence for that layer for a given time window; and identifying data sources or sensors from among the number of data sources and sensors responsible for activating the subset of nodes that most contribute to the maximum nonparametric divergence for each layer.

16. The computer program product of claim 15, wherein the recurrent neural network comprises one of:

a recurrent autoencoder;

a gated recurrent network; or a long short-term memory network.

17. The computer program product of claim 15, wherein the number of on-the-fly node activations corresponds to sequential overlapping series of events for a defined time window size.

18. The computer program product of claim 15, wherein the data sources comprise multi-modal data sources.

19. The computer program product of claim 15, further comprising instructions for identifying a subset of layers with the RNN that contribute most to an overall maximum deviation of the whole RNN.

20. The computer program product of claim 15, wherein the data sources are integrated at different layers of the RNN.

\* \* \* \* \*